US012604186B2

(12) United States Patent
Balmakhtar et al.

(10) Patent No.: US 12,604,186 B2
(45) Date of Patent: Apr. 14, 2026

(54) METHODS AND SYSTEMS FOR NETWORK AUTHENTICATION USING A UNIQUE AUTHENTICATION IDENTIFIER

(71) Applicant: T-Mobile Innovations LLC, Overland Park, KS (US)

(72) Inventors: Marouane Balmakhtar, Fairfax, VA (US); Galip Murat Karabulut, Vienna, VA (US); Lyle W. Paczkowski, Mission Hills, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 367 days.

(21) Appl. No.: 18/304,237

(22) Filed: Apr. 20, 2023

(65) Prior Publication Data

US 2024/0357349 A1 Oct. 24, 2024

(51) Int. Cl.
*H04L 29/06* (2006.01)
*H04W 12/06* (2021.01)

(52) U.S. Cl.
CPC .................................. *H04W 12/06* (2013.01)

(58) Field of Classification Search
CPC ...................................................... H04W 12/06
See application file for complete search history.

(56) References Cited

U.S. PATENT DOCUMENTS 10,448,251 B1 * 10/2019 Maria .................... H04W 12/06
11,715,340 B1 * 8/2023 Badik .................... G16H 40/20
726/6

12,477,328 B1 * 11/2025 Paczkowski ............ H04L 63/08
2009/0249457 A1 * 10/2009 Graff .................... G06F 21/6218
709/228

(Continued)

FOREIGN PATENT DOCUMENTS

EP 4451615 A1 10/2024
WO 2016144516 A1 9/2016

OTHER PUBLICATIONS

Roger Piqueras Jover et al., dHSS—Distributed Peer-to-Peer implementation of the Lte Hss based on the Bitcoin/Namecoin architecture, Jul. 7, 2016, IEEE, pp. 1-6. (Year: 2016).*

(Continued)

*Primary Examiner* — Kari L Schmidt
*Assistant Examiner* — Fahimeh Mohammadi

(57) ABSTRACT

A core network comprises a data store is configured to store a record associated with a wireless communication device, wherein the record comprises a plurality of pre-provisioned security parameters related to the wireless communication device. A core authentication application at the core network is configured to receive an authentication request comprising at least one security parameter stored at both the wireless communication device and in a record at the data store, obtain a registration identifier in response to inputting the at least one security parameter received in the authentication request into a first security application, obtain a network-side authentication identifier in response to inputting the registration identifier into a second security application, and determine whether the wireless communication device is authenticated and authorized to access the carrier network when a device-side authentication identifier matches the network-side authentication identifier.

13 Claims, 8 Drawing Sheets

(56) References Cited

U.S. PATENT DOCUMENTS

| 2013/0029601 | A1* | 1/2013 | Chan | H04W 88/06 |
| | | | | 455/41.2 |
| 2013/0095794 | A1* | 4/2013 | Lhamon | H04W 12/069 |
| | | | | 455/411 |
| 2018/0062847 | A1* | 3/2018 | Mildh | H04W 12/033 |
| 2019/0053050 | A1* | 2/2019 | Jin | H04W 12/35 |
| 2020/0068401 | A1* | 2/2020 | Li | H04W 12/043 |
| 2020/0107193 | A1* | 4/2020 | Seshadri | H04W 12/084 |
| 2022/0322083 | A1* | 10/2022 | Kreishan | H04W 12/0431 |
| 2023/0274020 | A1* | 8/2023 | Grover | H04L 9/088 |
| | | | | 713/155 |
| 2024/0187071 | A1* | 6/2024 | Li | H04W 24/10 |
| 2024/0365322 | A1* | 10/2024 | Islam | H04W 72/20 |
| 2025/0077639 | A1* | 3/2025 | Remer | H04L 63/0876 |

OTHER PUBLICATIONS

Lin Bai et al., Physical Layer Authentication in Wireless Communication Networks: A Survey, Sep. 2020, IEEE, vol. 5, Issue: 3, pp. 237-264. (Year: 2020).*

Hemant Sengar et al., Authentication and Integrity in Telecommunication Signaling Network, Apr. 18, 2005, IEEE, pp. 1-8. (Year: 2005).*

Luca Salgarelli et al., Efficient Authentication and Key Distribution in Wireless IP Networks, Dec. 2003, IEEE, vol. 10, Issue: 6, pp. 52-61. (Year: 2003).*

Foreign Communication from a Related Counterpart Application, Extended European Search Report and Written Opinion dated Aug. 28, 2024, European Application No. 24169943.8 filed on Oct. 23, 2024.

* cited by examiner

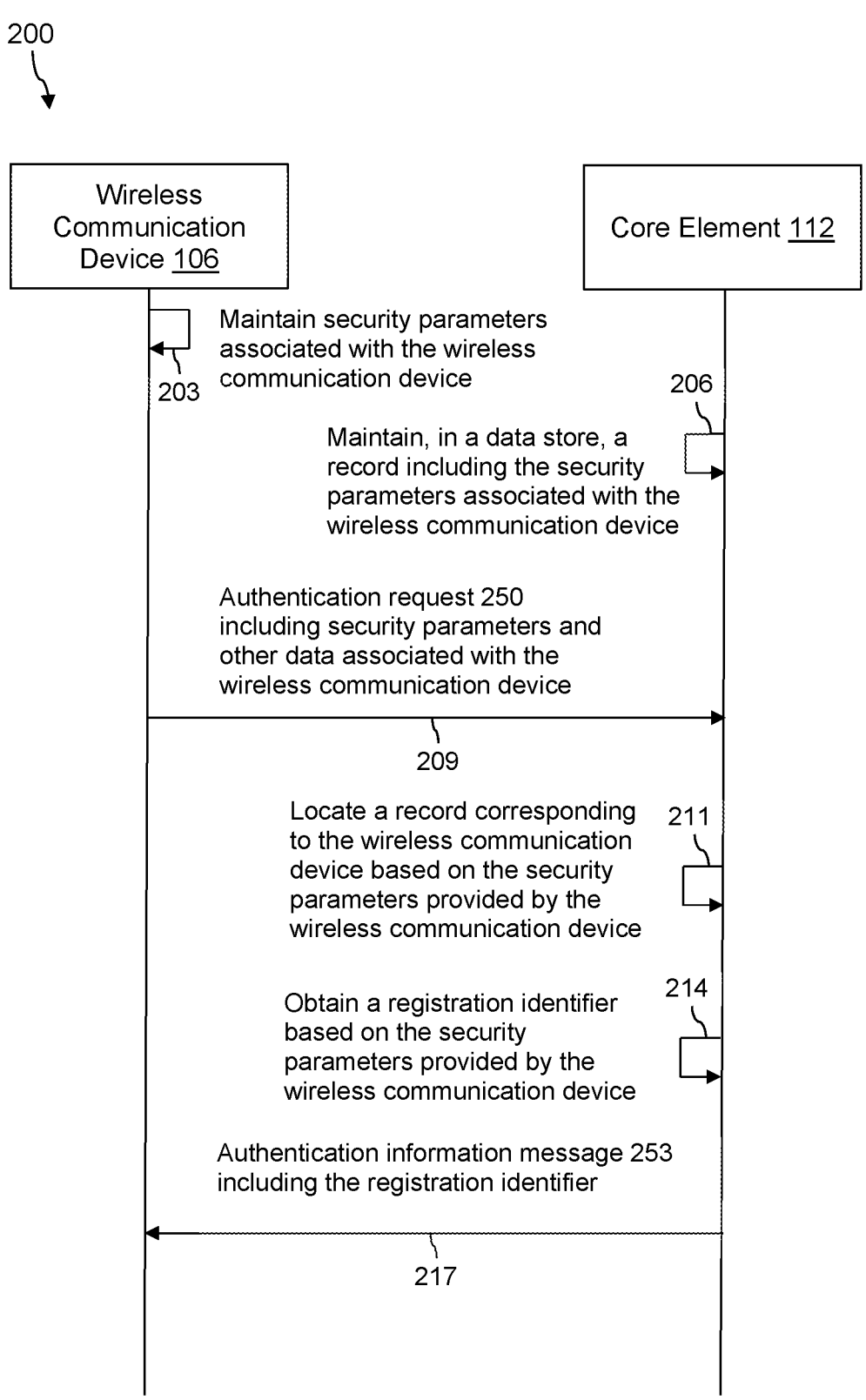

200

Wireless Communication Device 106

Core Element 112

Maintain security parameters associated with the wireless communication device

203

Maintain, in a data store, a record including the security parameters associated with the wireless communication device

206

Authentication request 250 including security parameters and other data associated with the wireless communication device

209

Locate a record corresponding to the wireless communication device based on the security parameters provided by the wireless communication device

211

Obtain a registration identifier based on the security parameters provided by the wireless communication device

214

Authentication information message 253 including the registration identifier

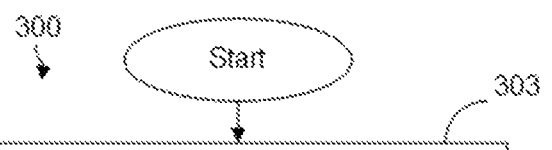

Start

303

Maintaining, in a data store accessible by a core network of the carrier network, a ledger comprising a plurality of records corresponding to different wireless communications devices registered with the carrier network, wherein the plurality of records comprise a record associated with the wireless communications device, wherein the record comprises a plurality of pre-provisioned security parameters related to the wireless communications device

306

Maintaining, in a memory of the wireless communications device, the plurality of pre-provisioned security parameters related to the wireless communications device

309

Transmitting, by a device authentication application of the wireless communications device to the core network, an authentication request comprising at least one security parameter stored at both the wireless communications device and in the record at the data store

312

Obtaining, by a core authentication application of the core network, a registration identifier based on a first security application and the at least one security parameter received in the authentication request

315

Transmitting, by the core authentication application of the core network, an authentication information message comprising the registration identifier to the wireless communications device

318

Obtaining, by a device authentication application of the wireless communications device, a device-side authentication identifier based on a second security application and the registration identifier received in the authentication information message

321

Transmitting, by the device authentication application, the device-side authentication identifier to the core network

324

Obtaining, by the core authentication application of the core network, a network-side authentication identifier in response to inputting the registration identifier into a third security application

327

Determining, by the core authentication application of the core network, whether the wireless communication device is authenticated and authorized to access the carrier network when the device-side authentication identifier matches the network-side authentication identifier

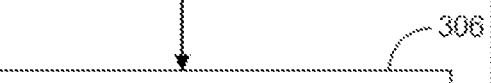

End

FIG. 3

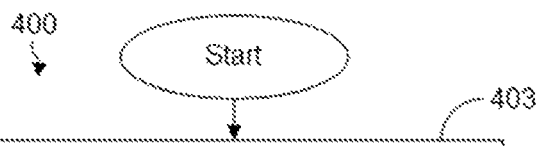

400

Start

403

Storing, at both a memory of a wireless communication device and a data store accessible to a core network of the carrier network, a plurality of pre-provisioned security parameters related to the wireless communications device, wherein the security parameters comprise at least one of identification data identifying the wireless communications device, software and hardware data describing software features and hardware features of the wireless communications device, one or more keys used for authenticating the wireless communications device, or capability data describing one or more capabilities of the wireless communications device

406

Receiving, by a core authentication application of the core network, an authentication request comprising at least one security parameter stored at both the wireless communications device and the data store in the core network

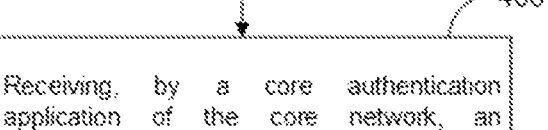

409

Obtaining, by the core authentication application of the core network, a registration identifier in response to inputting the at least one security parameter received in the authentication request into a first security application

412

Obtaining, by a core authentication application of the core network, a network-side authentication identifier in response to inputting the registration identifier into a second security application

415

Receiving, by the core authentication application of the core network, a device-side authentication identifier

418

Determining, by the core authentication application of the core network, whether the wireless communication device is authenticated and authorized to access the carrier network when the device-side authentication identifier matches the network-side authentication identifier

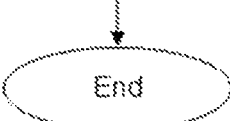

End

5G NR Access Network 554a    gNB 554b    gNB 554c    gNB

•••

559

Application Server 558    5G Core Network

560

Network

700

METHODS AND SYSTEMS FOR NETWORK AUTHENTICATION USING A UNIQUE AUTHENTICATION IDENTIFIER

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Authentication may be used to enable a wireless communication device to connect to a carrier network and use resources provided by the carrier network, such as, for example, telephone call services, Internet/data services, or messaging services. Wireless communication devices may complete an authentication process with the carrier network to obtain a wireless communication link to a radio access network (RAN) of the network. During a typical authentication process, the wireless communication device may obtain network access keys or network access credentials from a subscriber identity module (SIM) and provide those network access keys or network access credentials to a cell site of the carrier network. The SIM may be a fixed or removable SIM card, an electronic SIM (eSIM) profile included in an embedded universal integrated circuit card (eUICC) of the device. A SIM card may include a processor and a memory storing the network access keys and/or network access credentials. Meanwhile, an eSIM profile may be provisioned with the network access keys and/or network access credentials, branding information, applications, and other data artifacts. In this way, wireless communication devices typically provide data directly or indirectly from the SIM to a cell site in the carrier network to authenticate with the carrier network.

SUMMARY

In an embodiment, a method performed by a system for authenticating a wireless communication device with a carrier network is disclosed. The method comprises maintaining, in a data store accessible by a core network of the carrier network, a ledger comprising a plurality of records corresponding to different wireless communication devices registered with the carrier network. The plurality of records comprise a record associated with the wireless communication device. The record comprises a plurality of pre-provisioned security parameters related to the wireless communication device. The method further comprises maintaining, in a memory of the wireless communication device, the plurality of pre-provisioned security parameters related to the wireless communication device, transmitting, by an authentication application of the wireless communication device to the core network, an authentication request comprising at least one security parameter stored at both the wireless communication device and in the record at the data store, obtaining, by a core authentication application of the core network, a registration identifier based on a first security application and the at least one security parameter received in the authentication request, and transmitting, by the core authentication application of the core network, an authentication information message comprising the registration identifier to the wireless communication device. The method further comprises obtaining, by a device authentication application of the wireless communication device, a device-side authentication identifier based on a second security application and the registration identifier received in the authentication information message, transmitting, by the device authentication application, the device-side authentication identifier to the core network, obtaining, by the core authentication application of the core network, a network-side authentication identifier in response to inputting the registration identifier into a third security application, and determining, by the core authentication application of the core network, whether the wireless communication device is authenticated and authorized to access the carrier network when the device-side authentication identifier matches the network-side authentication identifier.

In a second embodiment, a method performed by a system for authenticating a wireless communication device with a carrier network is disclosed. The method comprises storing, at both a memory of a wireless communication device and a data store accessible to a core network of the carrier network, a plurality of pre-provisioned security parameters related to the wireless communication device, wherein the security parameters comprise at least one of identification data identifying the wireless communication device, software and hardware data describing software features and hardware features of the wireless communication device, one or more keys used for authenticating the wireless communication device, or capability data describing one or more capabilities of the wireless communication device. The method further comprises receiving, by a core authentication application of the core network, an authentication request comprising at least one security parameter stored at both the wireless communication device and the data store in the core network, obtaining, by the core authentication application of the core network, a registration identifier in response to inputting the at least one security parameter received in the authentication request into a first security application, obtaining, by a core authentication application of the core network, a network-side authentication identifier in response to inputting the registration identifier into a second security application, receiving, by the core authentication application of the core network, a device-side authentication identifier, and determining, by the core authentication application of the core network, whether the wireless communication device is authenticated and authorized to access the carrier network when the device-side authentication identifier matches the network-side authentication identifier.

In a third embodiment, a system comprising a core network is disclosed. The core network comprises at least one processor, at least one non-transitory memory, a data store, and a core authentication application. The data store is configured to store a ledger comprising a plurality of records corresponding to different wireless communication devices registered with a carrier network in association with a subscriber, wherein the plurality of records comprise a record associated with a wireless communication device, wherein the record comprises a plurality of pre-provisioned security parameters related to the wireless communication device. The core authentication application is stored in the at least one non-transitory memory. When the core authentication application is executed by the at least one processor, causes the at least one processor to be configured to receive an authentication request comprising at least one security parameter stored at both the wireless communication device and in a record at the data store, obtain a registration identifier in response to inputting the at least one security parameter received in the authentication request into a first security application, obtain a network-side authentication identifier in response to inputting the registration identifier into a second security application, receive a device-side authentication identifier, and determine whether the wireless communication device is authenticated and authorized to access the carrier network when the device-side authentication identifier matches the network-side authentication identifier.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIGS. 2A-B are message sequence diagrams of different example methods performed by the communication system of FIG. 1 according to an embodiment of the disclosure.

FIG. 3 is a flow chart of a first method performed by the system of FIG. 1 according to an embodiment of the disclosure.

FIG. 4 is a flow chart of a second method performed by the system of FIG. 1 according to an embodiment of the disclosure.

DETAILED DESCRIPTION

Figure 1:
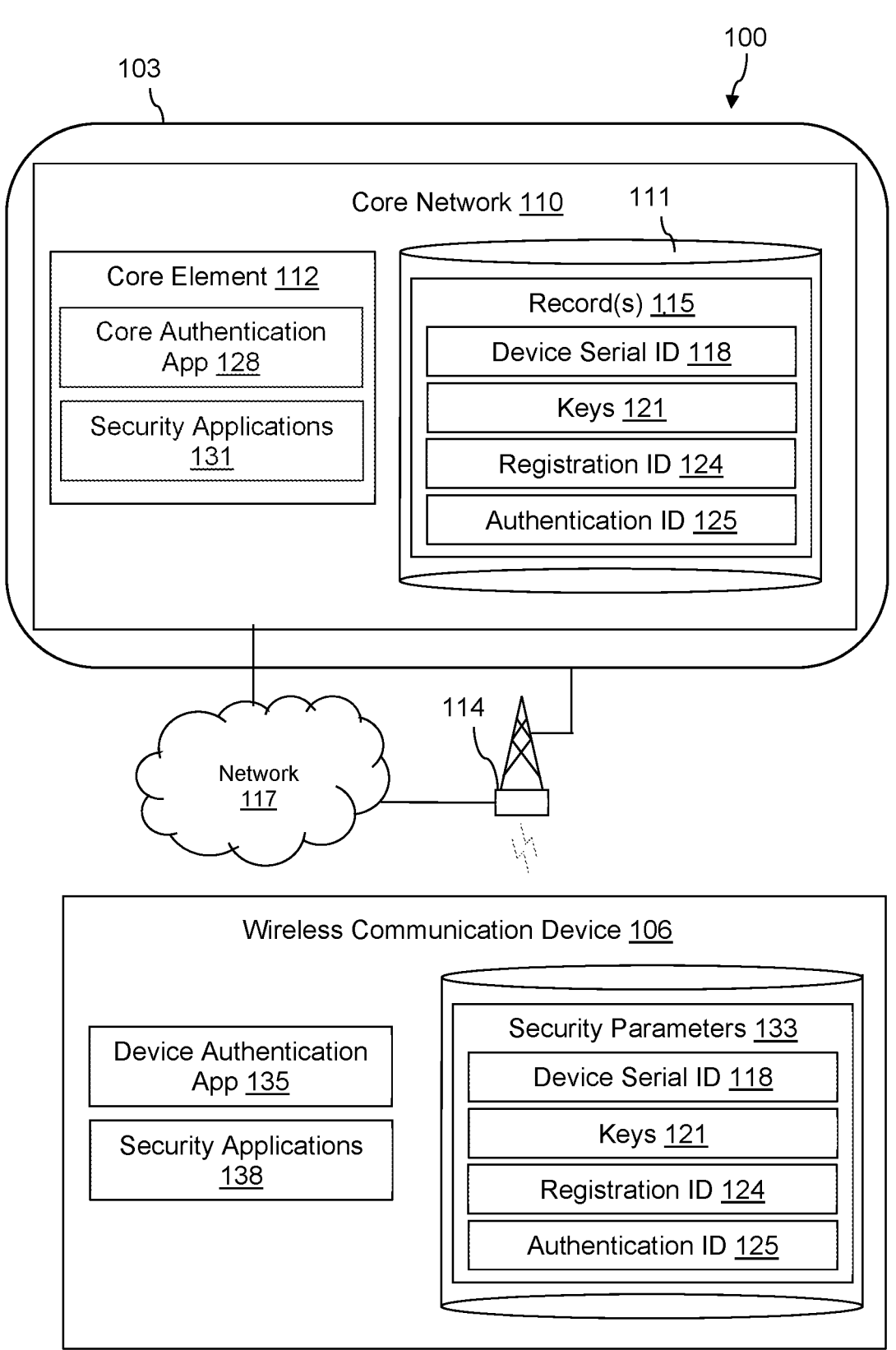
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

As mentioned above, subscriber identity module (SIM) authentication usually requires a wireless communication device to have a provisioned physical SIM card and/or an eSIM profile. For a device to utilize the SIM card, the device may include a physical SIM card slot and circuitry or chips that may be used to communicate with the physical SIM card. For a device to use an eSIM profile, the device may include an embedded universal integrated circuit card (eUICC), which includes both hardware and software components capable of storing multiple network profiles that may be provisioned and managed over-the-air (OTA).

However, provisioning a SIM slot or an eUICC on a wireless communication device may be costly for the manufacturer and may consume valuable real estate on the device.

Moreover, traditional methods of SIM authentication involve back and forth communications between the device and the core network. These communications often contain content that is not used or may not need to be used by the system to perform SIM based authentication, and as such, may not be justified for certain use cases.

For example, traditional methods of SIM authentication involve a wireless communication device, provisioned either with a SIM card or an eSIM profile, to transmit an international mobile subscriber identity (IMSI) uniquely identifying the SIM card or the eSIM profile to a core element in a core network for authentication. A core network may be part of a carrier network, and the carrier network may be owned and operated by a telecommunications service provider. The carrier network may also include the radio access network (RAN), which includes network components, such as cell sites, routers, media access gateways, and the like, and/or other resources that may be used by the device upon authentication. For example, the core element may be an entity or component in the core network, such as, the home location register (HLR), authentication center (AuC), mobile switching center (MSC) server, mobile management entity (MME), home subscriber server (HSS), or any other component in the core network configured to maintain data regarding subscribers and subscriber devices.

The core element may first determine whether the subscriber corresponding to the IMSI value is a genuine subscriber of the carrier network. The core element also performs the necessary cryptographic operations to generate an authentication vector necessary to challenge the device for authentication. The authentication vector may include random numbers used for authentication, an expected security response, and other security values, which may all be calculated using one or more keys (e.g., Ki) stored at the core network and specifically associated with the subscriber. The core element may transmit the authentication vector to the device, such that the device uses the random number with the locally stored keys and security algorithms to generate a local security response.

Therefore, as described above, SIM authentication is a time-consuming computation-heavy process that entails client side and network side security processing. In addition, the use of the SIM card or the eSIM profile is costly and consumes valuable real estate on devices, which becomes problematic as more small-scale devices enter the market. These small-scale devices may be inexpensive to manufacture and do not include enough real estate to include a SIM card or the hardware/software required for an eSIM profile. For example, Internet of Things (IoT) devices are increasingly being installed throughout subscriber homes, and these IoT devices are usually relatively small sized devices with minimum processing, storage, and communication resources. It would be difficult if not impossible to include the hardware and software necessary to provide a SIM card or an eSIM profile on these devices. Nevertheless, these devices may still need to authenticate with the carrier network before attaching to the carrier network.

The present disclosure addresses the foregoing technical problems by providing a technical solution in the technical field of device authentication. The embodiments disclosed herein may obviate the use of SIM cards and eSIM profiles in wireless communication devices. Instead, according to various embodiments, devices may authenticate with the carrier network using pre-provisioned data and one or more identifiers or certificates generated at the network-side and provided to the device for authentication.

In an embodiment, the core element at the core network may maintain data associated with devices registered with a subscriber of the core network. For example, a single subscriber may be associated with devices, one of which may be a mobile phone, another of which be a personal computer, and another of which may be an IoT device. Each of these devices may be registered with the subscriber, and the core element may have access to a data store storing data describing each of these devices.

The data store may include a record for each device associated with the subscriber. The record may include identification data, such as, for example, a device serial identifier assigned by the manufacturer of the device. The record may also include keys specifically allocated for the device and/or subscriber by the service provider associated with the carrier network. The keys may include private keys or shared keys used to authenticate the device. The record may also include hardware and software data describing hardware and software features of the device. For example, the hardware and software data may indicate processing power, memory size, available memory, power source information, hardware identifier, library identifier, installed software applications, or any other data related to the hardware features of the device. The record may also include capability data describing capabilities of the device. For example, the capability data may indicate whether the device is capable of transmitting, receiving, or encoding certain formats of data. The capability data may also indicate types of connectivity permitted by the device or any other data capabilities of the device. As should be appreciated, the record may include any type of data associated with the device, some of which may be data pre-provisioned by the manufacturer of the device or the service provider. The core element may also maintain generated data associated with authenticating the device for multiple different sessions, as further described below.

In the core network, the records may be stored in a highly secure fashion so as to be immutable (i.e., data in the record cannot be edited, although the additional data may be added to the record or to a subsequent record that supersedes the prior record). For example, each record may be formatted as a blockchain, in which the first block (block 0) of the blockchain includes identification information of the device (e.g., device serial identifier). It should be appreciated that the records may be formatted in any form of a ledger that maintains the validity and immutable nature of the data in the record. The data store may store the records in a trusted space, such as, for example, in a Root of Trust, trust zone or using a trusted platform module (TPM). The data store may be implemented in a secure manner, such as for example, as a zero-trust architecture that ensures the records in the data store are continually evaluated and securely protected.

Like the core network, the devices may also be pre-provisioned with data similar to those mentioned above (i.e., identification data, keys, hardware and software data, capability data, etc.). At the device, this data may be referred to herein as security parameters since this data is used to authenticate the wireless communication device with the carrier network, as further described herein. In this way, both the core network and the devices maintain data regarding identification, features, and capabilities of devices registered with the carrier network.

According to various embodiments, the wireless communication devices may authenticate with the core network using the data stored at the core network and the data stored at the wireless communication devices. In an embodiment, when a device attempts to attach to the network, an authentication application at the device may first transmit an authentication request to the core element. Instead of including an IMSI in the authentication request, the authentication request may include any of security parameters described above, which may be stored in a record at the core network. For example, the authentication request may include a device serial identifier, or other identification data identifying the device sending the authentication request. The identification data in the authentication request may also be stored in a record at the core network when the device is registered with the service provider. The authentication request may include other information as well that is not necessarily stored in a record, but may be added by the core network to the corresponding record in response to receiving the authentication request. For example, the authentication request may include additional capability data, which the core element may add to the record as new capability data.

Upon receiving the authentication request, a core authentication application at the core element may determine whether the subscriber corresponding to the data in the request is indeed a genuine subscriber of the carrier network. The core authentication application may search the records in the data store to determine whether a record exists that includes the data carried in the authentication request. For example, when the authentication request includes a device serial identifier, the core authentication application may perform a look up in the data store for the device serial identifier carried in the authentication request. When the core authentication application obtains a record including the device serial identifier, the core authentication application may determine that the device belongs to a subscriber of the carrier network.

Upon determining that the device belongs to a subscriber of the carrier network, the core authentication application may generate a registration identifier based on the data stored in the record corresponding to the device and/or any other data received from the device in the authentication request. In an embodiment, the registration identifier may be a numerical value generated by the core network and used by both the core network and the device to determine an authentication identifier, as further described herein.

In an embodiment, the core authentication application may generate the registration identifier by inputting data from the record into one or more security algorithms accessible to the core authentication application. For example, one or more keys and a hardware identifier from the located record may be input into a first security algorithm to obtain the registration identifier. The core element may maintain different security algorithms for different devices or subscribers. In this way, the security algorithms may be specific to the device or the subscriber, and registered devices may maintain the same security algorithm that was allocated or generated specifically for the device.

The core authentication application may provide the registration identifier to the device in response to the authentication request in an authentication information element. The authentication application at the device may input the registration identifier and/or any other security parameter into a second security algorithm maintained at the device to obtain a device-side authentication identifier. The authentication identifier may be a numerical value uniquely identifying the device and a particular session between the device and the carrier network (i.e., each session created between the device and the network may require a different authentication identifier). The authentication application at the device may transmit the device-side authentication identifier back to the core authentication application at the core element as a security response in response to the authentication information message.

The core authentication application may include a security algorithm that is the same as the second security algorithm maintained at the wireless communication device. The core authentication application may input the registration identifier and/or any other security parameters into this security algorithm to obtain a network-side authentication identifier. When the network-side authentication identifier matches the device-side authentication identifier, the core authentication application may determine that the wireless communication device is authenticated and authorized to access the carrier network. The core network may then proceed with the next steps to provide the wireless communication device access to the carrier network and the underlying RAN. Alternatively, when the network-side authentication identifier does not match the device-side authentication identifier, the core authentication application may determine that the wireless communication device is not authenticated and not authorized to access the carrier network.

In an embodiment, the device may send an authorization request to obtain an authentication identifier for each session between the wireless communication device and the core network. In other words, a single authentication identifier may not be used for multiple sessions between the device and the core network. The system may require the device re-authenticate with the core network each time the device establishes a new session with the core network. This serves to add another layer of security to the authentication schemes disclosed herein.

In an embodiment, the authentication application at the device may add other data to a message carrying the device-side authentication identifier, or may append other data to the device-side authentication identifier. For example, the device authentication application may add an egress node address or identifier of a previous session or sessions to the device-side authentication identifier or the message carrying the device-side authentication identifier before transmitting the device-side authentication identifier back to the core network for storage at the corresponding record. The egress node address or identifier may indicate an egress node to which the wireless communication device is or was previously attached. The addition of the egress node address or identifier may provide an additional layer of security to the authentication schemes disclosed herein. A device attempting to attach to the carrier network not only needs to provide the correct authentication identifier to authenticate with the carrier network, but the device may need to ensure that the authentication identifier corresponds to the current session, and that the authentication identifier is received by the core network from the correct egress address or identifier to continue to be authenticated with the network.

In this way, the embodiments disclosed herein efficiently and effectively authenticate devices with a carrier network without the need for provisioning physical SIM cards or eSIM profiles, thereby reducing the cost of manufacturing these devices and increasing the available memory and processing resources in these devices. Moreover, the embodiments disclosed herein offload the majority of the authentication tasks to the core network, minimizing the tasks performed by the wireless communication device, which may be beneficial when the device is a lightweight device without much processing or battery power. Similarly, the embodiments disclosed herein reduce the amount of communications that need to be transmitted back and forth between the core element and the device to authenticate the device. Accordingly, the systems and methods for device authentication disclosed herein are more resource efficient at the device level and the network level.

Turning now to FIG. 1, a communication system 100 is described. The system 100 comprises a carrier network 103, one or more wireless communication devices 106, a cell site 114, and a network 117. The wireless communication devices 106 may be communicatively coupled to the carrier network 103 and/or network 117 via the cell site 114.

The wireless communication device 106 may be a cell phone, a mobile phone, a smart phone, a personal digital assistant (PDA), an Internet of things (IoT) device, a wearable computer, a headset computer, a laptop computer, a tablet computer, or a notebook computer. In some embodiments, the wireless communication device 106 may be a lightweight device, such as an IoT device, that may or may not include certain hardware features (e.g., large battery, display, microphone, speakers, etc.). The cell site 114 may provide the wireless communication device 106 a wireless communication link to the carrier network 103 and/or network 117 according to a 5G, a long term evolution (LTE), a code division multiple access (CDMA), or a global system for mobile communications (GSM) wireless telecommunication protocol.

The network 117 may be one or more private networks, one or more public networks, the Internet, or a combination thereof. While FIG. 1 shows the carrier network 103 as being separate from the network 117, it should be appreciated that, in some embodiments, at least a portion of the carrier network 103 may be part of the network 117. The carrier network 103 may be a network including a RAN and a core network 110. The RAN may include the access network containing the radio elements of a cell network, and the core network 110 may include the elements that manage the subscriber information, call setup and routing, and related system supports. In an embodiment, the core network 110 may be an evolved packet core (EPC) core network. The core network 110 may be configured to implement a 5G, a LTE, a CDMA, or a GSM wireless telecommunication protocol. In one embodiment, the core network 110 may be a 3rd Generation Partnership Project (3GPP) Evolved Packet System (EPS).

While FIG. 1 shows the wireless communication device 106 connected to the network 117 and the carrier network 103 via the cell site 114, it should be appreciated that the wireless communication device 106 may be connected to the network 117 and the carrier network 103 via another non-3GPP access network or connection. For example, the wireless communication device 106 may be connected to the network 117 and the carrier network 103 via a non-3GPP interworking function (N3IWF), which may be responsible for interworking between untrusted non-3GPP network and a 5G core network. N3IWF may support both N2 and N3 connectivity to the 5G core network, with a secure tunnel (e.g., IPSec) connectivity towards the wireless communication device 106. In another case, the system may further include a local area network (LAN) and/or WiFi connectivity using one or more wireless access points, and the wireless communication device 106 may be connected to the network 107 and the carrier network 103 via the LAN and/or the wireless access points.

As shown in FIG. 1, the core network 110 includes a core element 112, which may include a core authentication application 128 and one or more security applications 131. As mentioned above, the core element 112 may be any entity or component in the core network 110, such as, for example, a cell site, a HLR, an AuC, a MSC server, a MME, a HSS, or any other component of the core network. The core authentication application 128 may be an application, comprised of instructions, which when executed by one or more processors, causes the core authentication application 128 to perform authentication of devices 106 according to the embodiments disclosed herein. The security applications 131 may be, for example, security algorithms designed to receive one or more values as input and output one or more values, such that the outputted values are used to perform the authentication of devices 106 according to the embodiments disclosed herein. For example, the security applications 131 may be algorithms or instructions used to authenticate the device 106 using, for example, cryptographic hash algorithms, key generation algorithms, etc. While FIG. 1 shows the core authentication application 128 and the security applications 131 being part of the core element 112 in the core network 110, it should be appreciated that the core authentication application 128 and the security applications 131 may be positioned anywhere in the core network 110 (e.g., in the core element 112) or external to the core network 110.

The core network 110 may also include a data store 111. The data store 111 may be positioned at the core network 110 or at a separate data center, distributed across one or more memories of the data center, accessible by the core authentication application 128. The data store 111 may store the records 115, which includes data associated with devices 106 registered with subscribers associated with the carrier network 103. A single subscriber may include multiple records 115 each corresponding to a different wireless communication device 106 belonging to the subscriber and registered with the service provider.

The records 115 may be stored in a highly secure fashion so as to be immutable in that the data in the record may not be edited once written into the record. However, data may be permitted to be added to the record 115 or added to a subsequent record 115 that supersedes the prior record 115. To this end, the records 115 may be encoded in a highly secure format. For example, each record may be formatted as a blockchain, in which the first block (block 0) of the blockchain includes a particular security parameter (e.g., identification information of the device). It should be appreciated that the records 115 may be encoded in any other form of a ledger that preserves the validity and security of the data in the record 115.

The data store 111 storing the records 115 may be in a trusted space, such as, for example, in a trust zone or using a trusted platform module (TPM). The data store 111 may be implemented as a zero-trust architecture to ensure the records 115 in the data store are continually evaluated and securely protected.

The records 115 may include a variety of different types of data, such as, for example, identification data, security data, hardware and software data, capability data, etc. The identification data may include the device serial identifier 118, which may be a serial number assigned by a manufacturer of the device 106. The security data may include one keys 121, which may be private keys or shared keys used for authentication purposes. The records 115 may also store the registration identifier 124 and the authentication identifiers 125 associated with the wireless communication device 106. As described herein, the core authentication application 128 at the core network 110 generates the registration identifier 124 by inputting data from an authentication request and/or other data in the record 115 into a first security application

131. In some embodiments, the registration identifier 124 may be formatted as a numerical value or as a certificate, either of which may be used as a key or other input into a security application 131 and 138. The authentication identifiers 125 may include a network-side authentication identifier 125 and/or a device-side authentication identifier 125. The network-side authentication identifier 125 is a numerical value calculated by inputting the registration identifier 124 of the wireless communication device 106 and data from the record 115 (i.e., security parameters 133) into a security application 131 at the core element 112. The device-side authentication identifier 125 is a numerical value calculated by inputting the registration identifier 124 of the wireless communication device 106 and one or more security parameters 133 into a security application 138 at the wireless communication device 106, as further described below. According to the embodiments disclosed herein when the network-side authentication identifier 125 and the device-side authentication identifier 125 match, then wireless communication device 106 may be considered authenticated and authorized to access the carrier network 103.

Each time a new session is successfully established between the wireless communication device 106 and the carrier network 103, a new registration identifier 124 may be provided to the wireless communication device 106, and new authentication identifiers 125 may be obtained (i.e., generated, computed, or calculated) based on the new registration identifier 124. In this way, the record 115 may maintain multiple pairs of registration identifiers 124 and corresponding authentication identifiers 125 (both network-side and device-side) for each session between the wireless communication device 106 and the carrier network 103. It should be appreciated that the records 115 may include other types of data not shown in FIG. 1.

The wireless communication device 106 includes a device authentication application 135 and one or more security applications 138. The device authentication application 128 may be an application, comprised of instructions, which when executed by one or more processors, causes the device authentication application 128 to perform authentication of the wireless communication device 106 according to the embodiments disclosed herein. The security applications 138 may be, for example, security algorithms designed to receive one or more values as input and output one or more values, such that the outputted values are used to perform the authentication of wireless communication devices 106 according to the embodiments disclosed herein. Depending on whether the wireless communication device 106 is authenticated with the core network 110, the security applications 128 at the wireless communication device 106 may be the same or different from the security applications 131 at the core network 110. In some cases, when the security applications 128 at the wireless communication device 106 are different from the security applications 131 at the core network 110, the wireless communication device 106 may not be authenticated and thus, may not access the carrier network 103. This may be because, at registration of a wireless communication device 106 with a subscriber, both the wireless communication device 106 and the core network 110 may be pre-provisioned with the same or similar security applications 131 and 138. In this way, when the security applications 131 at the core network 110 are different from the security applications 138 at the wireless communication device 106, the wireless communication device 106 and the core network 110 may compute different authentication identifiers 125 (device-side and network-side), evidencing that the wireless communication device 106 was not properly registered with the carrier network 103. As described herein, when the device-side authentication identifier 125 computed by the wireless communication device 106 does not match the network-side authentication identifier 126 computed by the core element 112, the wireless communication device 106 may not be authenticated with the carrier network 103.

The wireless communication device 106 may also maintain a local database storing security parameters 133. The security parameters 133 comprise data similar to that which is stored in a corresponding record 115 at the core network 110. The security parameters 133 may include, for example, identification data, hardware and software data, security data, capability data, etc. As shown in FIG. 1, the security parameters 133 may also store the device serial identifier 118, keys 121, registration identifiers 124, and authentication identifiers 125. It should be appreciated that the security parameters 133 may include other types of data not shown in FIG. 1.

Figure 2B:
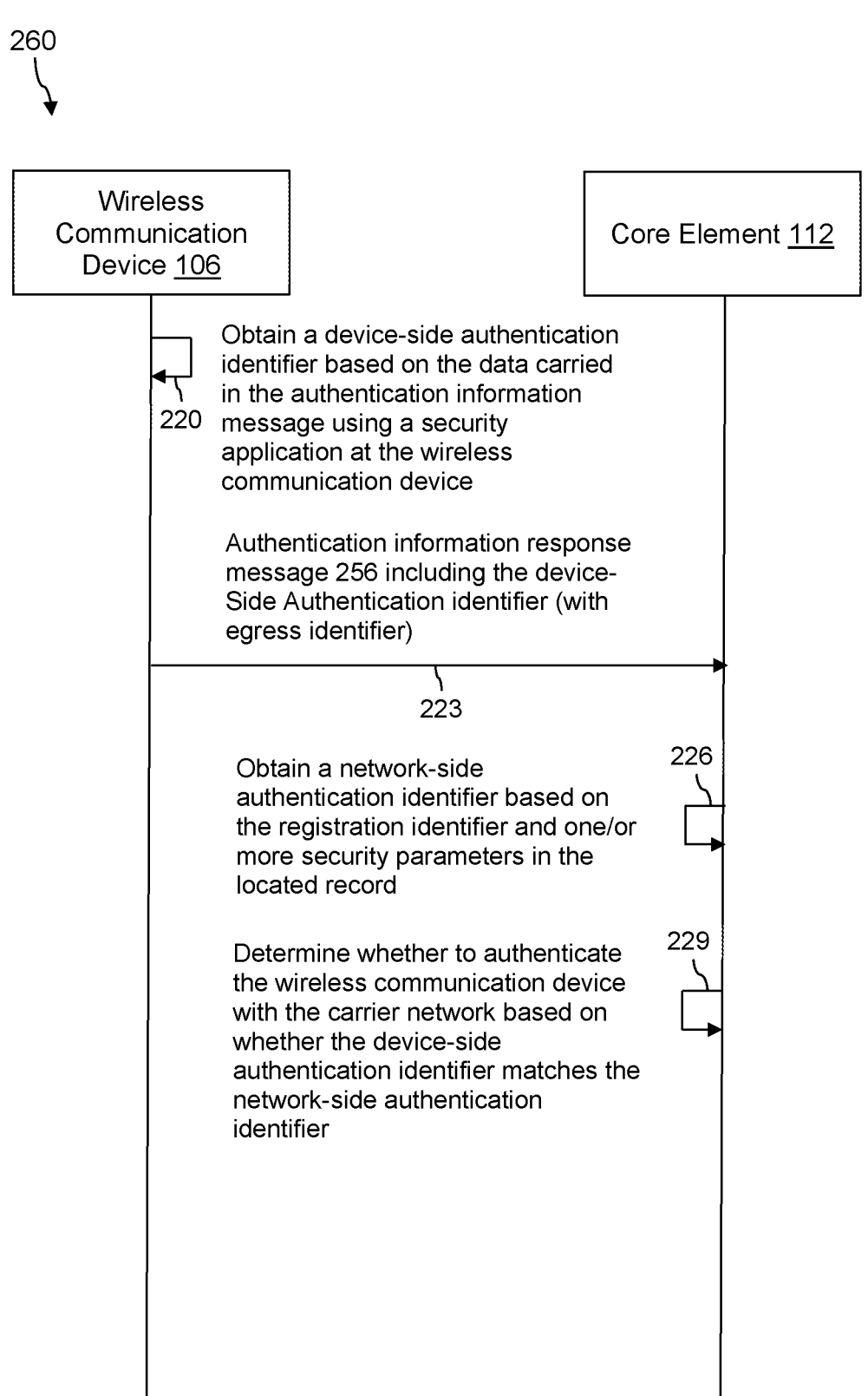

Turning now to FIGS. 2A-B, shown are message sequence diagrams 200 and 260 illustrating different examples of messages sent between the wireless communication device 106 and the core element 112 according to various embodiments of the disclosure. Beginning with FIG. 2A, shown is the message sequence diagram 200. At step 203, the wireless communication device 106 may maintain security parameters 133 across one or more memories of the wireless communication device 106. The security parameters 133 include various types of data associated with the wireless communication device 106, which may later be used as input into one or more security applications 138 to authenticate the wireless communication device 106. Various examples of security parameters 133 are described above.

At step 206, core element 112 maintains, in a data store 111, at least one record 115 including at least the same security parameters 133 that are also stored at the wireless communication device 106. The record 115 may be encoded as a blockchain or any other ledger format, ensuring that the data already saved to the record 115 is immutable.

At step 209, the device authentication application 135 in the wireless communication device 106 transmits an authentication request 250 to the core network 110. The authentication request 250 may include any of the security parameters 133 stored at the wireless communication device 106. For example, the authentication request 250 may include the device serial identifier 118, a hardware identifier (e.g., central processing unit (CPU) identifier or a composite identifier generated/calculated based on different hardware components installed at the time of manufacturing) of the wireless communication device 106, a library identifier, one or more security certificates associated with the wireless communication device 106, etc.

At step 211, the core authentication application 128 in the core element 112 locates a record 115 in the data store 111 corresponding to the wireless communication device 106 based on the security parameters 133 carried in the authentication request 250. In some cases, each subscriber or wireless communication device 106 of the subscriber may be pre-provisioned with certain keys 121, which may be private or shared keys. When the authentication request 250 includes a key 121 exclusively allocated to the subscriber or the device 106 of the subscriber, the core authentication application 128 may search the data store 111 to locate a record 115 corresponding to the key 121. A similar search may be performed on the data store 111 using any of the security parameters 133 carried in the authentication request when the security parameter 133 has been exclusively pre-provisioned to the subscriber or the wireless communication device 106.

At step 214, when the record 115 corresponding to the wireless communication device 106 is located, the core authentication application 128 may obtain (i.e., generate, compute, calculate) a registration identifier 124 corresponding to the authentication request from the wireless communication device 106. The registration identifier 124 may be obtained based on the security parameters 133 carried in the authentication request, any of the data stored in the located record 115, and/or a security application 131. In an embodiment, the core authentication application 128 obtains the registration identifier 124 by inputting one or more of the security parameters 133 carried in the authentication request and/or any of the data stored in the located record 115 into a first security application 131. The first security application 131 may receive one or more of the parameters 133 carried in the authentication request and/or any of the data stored in the located record 115 as input, and then output at least the registration identifier 124.

At step 217, the core authentication application 128 transmits an authentication information message 253 to the wireless communication device 106, in which the authentication information message 253 includes at least the registration identifier 123. In an embodiment, the authentication information message 253 includes only the registration identifier 124, which may be a single numerical value or certificate. In this way, the authentication information message 253 may be smaller size than a traditional authentication vector that is sent from the core network 110 to the wireless communication device 106, which may include a quintet or triplet of parameters.

Turning now to FIG. 2B, shown is message sequence diagram 260, which is a continuation of the method shown in message sequence diagram 200. After the wireless communication device 106 receives the authentication information message 253 from the core network 110, at step 220, the device authentication application 135 may obtain (i.e., generate, calculate, compute) the device-side authentication identifier 125 based on the data carried in the authentication information message 253. As mentioned above, the device-side authentication identifier 125 may be a numerical value uniquely identifying the device 106 and a current session between the device 106 and the carrier network 103.

The device authentication application 135 may obtain the device-side authentication identifier 125 by inputting data from the authentication information message 253 into a second security application 138 at the wireless communication device 106. The second security application 138 may be different from the first security application 131 at the core network 110 that was used to obtain the registration identifier 124. One of the inputs into the second security application 138 may be the registration identifier 124 received in the authentication information message 253. As should be appreciated, other inputs (e.g., security parameters 133) may be passed into the second security application 138, aside from the registration identifier 124, to output the device-side authentication identifier 125. For example, the device authentication application 135 may input the registration identifier 124 and one or more keys 121 into the second security application 138 to obtain the authentication identifier 125. As should be appreciated, the second security application 138 may use any number or type of input values to obtain the authentication identifier 125.

At step 223, the device authentication application 135 may transmit an authentication information response 256 including the device-side authentication identifier 125 to the core network 110. In an embodiment, the authentication information response 256 may include an identifier or an address of an egress node to which the wireless communication device 106 is currently attached. The egress node may be a network element, such as, for example, a router, switch, bridge, gateway, or virtual private network (VPN) by which the wireless communication device 106 connects to the network 117.

At step 226, the core authentication application 128 may obtain (i.e., generate, calculate, compute) a network-side authentication identifier 125, which may be the same or different from the device-side authentication identifier 125 obtained at the wireless communication device 106. The core authentication application 128 may obtain the network-side authentication identifier 125 based on the registration identifier 124 calculated for the session and one or more security parameters 133 included in the record 115 associated with the wireless communication device 106. The core authentication application 128 may input the registration identifier 124 and/or one or more security parameters 133 from the located record 115 into a third security application 131 to obtain the network-side authentication identifier 125. The third security application 131 may be the same or similar to the second security application 138 used to obtain the device-side authentication identifier 125 when the wireless communication device 106 is authenticated with the carrier network 103. However, when the wireless communication device 106 is not to be authenticated with the carrier network 103, the third security application 131 may be different from the second security application 138 at the device 106.

At this stage, the core authentication application 128 has received the device-side authentication identifier 125 and has calculated the network-side authentication identifier 125. At step 229, the core authentication application 128 may compare the device-side authentication identifier 125 with the network-side authentication identifier 125. When the device-side authentication identifier 125 matches the network-side authentication identifier 125, the core authentication application 128 may determine that the wireless communication device 106 is authenticated with the carrier network 103 and authorized to access the carrier network 103. In this case, both the core network 110 and the wireless communication device 106 have the registration identifier 124 and were pre-provisioned with the same security applications 131 and 138 used to calculate the authentication identifier 125. As mentioned above, the security applications 131 are pre-provisioned or pre-loaded on the wireless communication device 106 by the manufacturer or the service provider, and the security applications 131 are pre-provisioned at the core network 110 at the time of registering the wireless communication device 106. In this way, providing the same input to the security applications 131 and 138 should produce the same output of the device-side and network-side authentication identifiers 125, thereby serving to verify that the wireless communication device 106 is indeed associated with a subscriber registered with the carrier network 103 and communicating with the core network 110 of the carrier network 103 to which the wireless communication device 106 is subscribed.

Turning now to FIG. 3, a method 300 is described. Method 300 may be performed by the core authentication application 128 in the core network 110 and the device authentication application 135 in the wireless communication device 106. Method 300 may be performed after the security parameters 133 have been pre-provisioned, or prestored, at the wireless communication device 106 and at the data store 111 in the core network 110.

At step 303, method 300 comprises maintaining, in a data store 111 accessible by a core network 110 of the carrier network 103, a ledger comprising a plurality of records 115 corresponding to different wireless communication devices 106 registered with the carrier network 103. In an embodiment, the records 115 comprise a record 115 associated with the wireless communication device 106. In an embodiment, the record 115 comprises a plurality of pre-provisioned security parameters 133 related to the wireless communication device 106.

At step 306, method 300 comprises maintaining, in a memory of the wireless communication device 106, the plurality of pre-provisioned security parameters 133 related to the wireless communication device 106. At step 309, method 300 comprises transmitting, by a device authentication application 135 of the wireless communication device 106 to the core network 110, an authentication request 250 comprising at least one security parameter 133 stored at both the wireless communication device 106 and the data store 111 in the core network 110.

At step 312, method 300 comprises obtaining, by a core authentication application 128 of the core network 110, a registration identifier 124 based on a first security application 131 and the at least one security parameter 133 received in the authentication request 250. At step 315, method 300 comprises transmitting, by the core authentication application 128 of the core network 110, an authentication information message 253 comprising the registration identifier 124 to the wireless communication device 106. At step 318, method 300 comprises obtaining, by a device authentication application 135 of the wireless communication device 106, a device-side authentication identifier 125 based on a second security application 138 and the registration identifier 124 received in the authentication information message 253. At step 321, method 300 comprises transmitting, by the device authentication application 135, the device-side authentication identifier 125 to the core network 110. At step 324, method 300 comprises obtaining, by the core authentication application 128 of the core network 110, a network-side authentication identifier 125 in response to inputting the registration identifier 124 into a third security application 131. At step 327, method 300 comprises determining, by the core authentication application 128 of the core network 110, whether the wireless communication device 106 is authenticated and authorized to access the carrier network 103 when the device-side authentication identifier 125 matches the network-side authentication identifier 125.

In some embodiments, the security parameters 133 comprise at least one of identification data identifying the wireless communication device 106, software and hardware data describing software features and hardware features of the wireless communication device 106, one or more keys 121 used for authenticating the wireless communication device 106, or capability data describing one or more capabilities of the wireless communication device 106. In an embodiment, the at least one security parameter 133 in the authentication request 250 is a device serial identifier 118 of the wireless communication device 106 allocated by the manufacturer of the wireless communication device 106. In an embodiment, the first security application 131 receives the at least one security parameter 133 from the authentication request 250 and a key 121 from the pre-provisioned security parameters 133 stored in the record 115 as input, and an output of the first security application 131 comprises the registration identifier 124. In an embodiment, the second security application 138 and the third security application 131 comprise a common security algorithm. In an embodiment, the device-side authentication identifier 125 is obtained in response to inputting the registration identifier 124 and one or more other security parameters 133 into the second security application 138, and the network-side authentication identifier 125 is obtained in response to inputting the registration identifier 124 and the one or more other security parameters 133 into the third security application 131.

Turning now to FIG. 4, a method 400 is described. Method 400 may be performed by the core authentication application 128 in the core network 110 and the device authentication application 135 in the wireless communication device 106. Method 400 may be performed after the security parameters 133 have been pre-provisioned, or stored, at the wireless communication device 106 and at the data store 111 in the core network 110.

At step 403, method 400 comprises storing, at both a memory of a wireless communication device 106 and a data store 111 accessible to a core network 110 of the carrier network 103, a plurality of pre-provisioned security parameters 133 related to the wireless communication device 106. In an embodiment, the security parameters 133 comprise at least one of identification data identifying the wireless communication device 106, software and hardware data describing software features and hardware features of the wireless communication device 106, one or more keys 121 used for authenticating the wireless communication device 106, or capability data describing one or more capabilities of the wireless communication device 106.

At step 406, method 400 comprises receiving, by a core authentication application 128 of the core network 110, an authentication request 250 comprising at least one security parameter 133 stored at both the wireless communication device 106 and the data store 111 in the core network 110. At step 409, method 400 comprises obtaining, by the core authentication application 128 of the core network 110, a registration identifier 124 in response to inputting the at least one security parameter 133 received in the authentication request 250 into a first security application 131.

At step 412, method 400 comprises obtaining, by a core authentication application 128 of the core network 110, a network-side authentication identifier 125 in response to inputting the registration identifier 124 into a second security application 131. At step 415, method 400 comprises receiving, by the core authentication application 128 of the core network 110, a device-side authentication identifier 125. At step 418, method 400 comprises determining, by the core authentication application 128 of the core network 110, whether the wireless communication device 106 is authenticated and authorized to access the carrier network 103 when the device-side authentication identifier 125 matches the network-side authentication identifier 125.

In some embodiments, the data store 111 is accessible to the core network 110, and the pre-provisioned security parameters 133 of the wireless communication device 106 are stored in a record 115 in the format of a ledger. In this embodiment, the ledger is a blockchain, and wherein a first block of the block chain comprises a device serial identifier 118 identifying the wireless communication device 106. In an embodiment, the first security application 131 receives the at least one security parameter 133 from the authentication request 250 and a key 121 from the pre-provisioned security parameters 133 stored in the record 115 as input, and an output of the first security application 131 comprises the registration identifier 124. In an embodiment, the network-side authentication identifier 125 is obtained in response to inputting the registration identifier 124 and the one or more other security parameters 133 into the second security application 131.

Figure 5A:
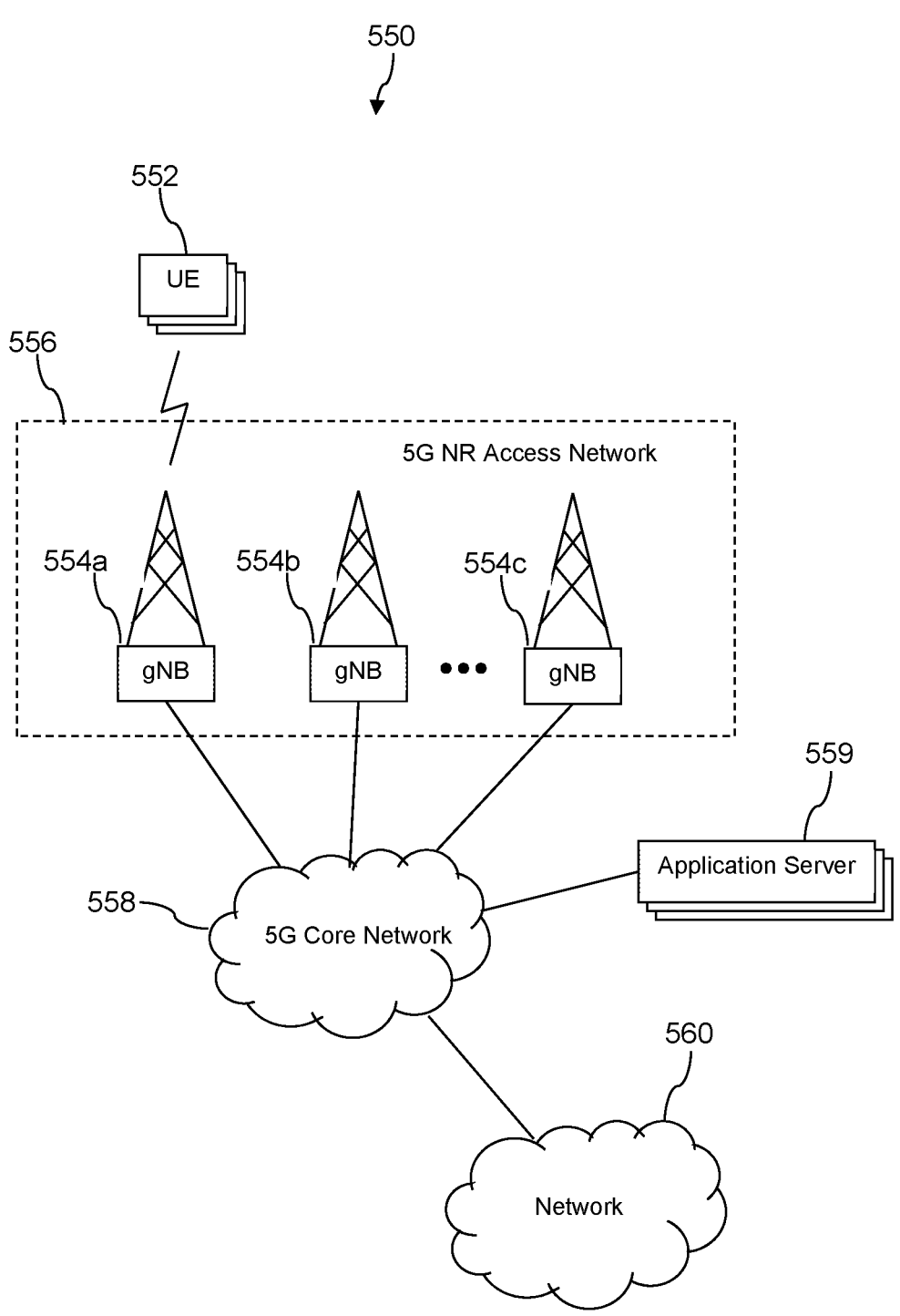
FIGS. 5A-B are block diagrams illustrating a communication system similar to the communication system of FIG. 1 according to an embodiment of the disclosure.

Turning now to FIG. 5A, an exemplary communication system 550 is described. In an embodiment, the communication system 550 may be implemented in the system 100 of FIG. 1. The communication system 550 includes a number of access nodes 554 that are configured to provide coverage in which UEs 552, such as cell phones, tablet computers, machine-type-communication devices, tracking devices, embedded wireless modules, and/or other wirelessly equipped communication devices (whether or not user operated). The access nodes 554 may be said to establish an access network 556. The access network 556 may be referred to as RAN in some contexts. In a 5G technology generation an access node 554 may be referred to as a gigabit Node B (gNB). In 4G technology (e.g., LTE technology) an access node 554 may be referred to as an eNB. In 3G technology (e.g., CDMA and GSM) an access node 554 may be referred to as a base transceiver station (BTS) combined with a base station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations or other types of access networks (e.g., a terrestrial wireless communications base station).

In an embodiment, the access network 556 comprises a first access node 554a, a second access node 554b, and a third access node 554c. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. Network 560 may also be a data network. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"-such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHz), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554.

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 5B:
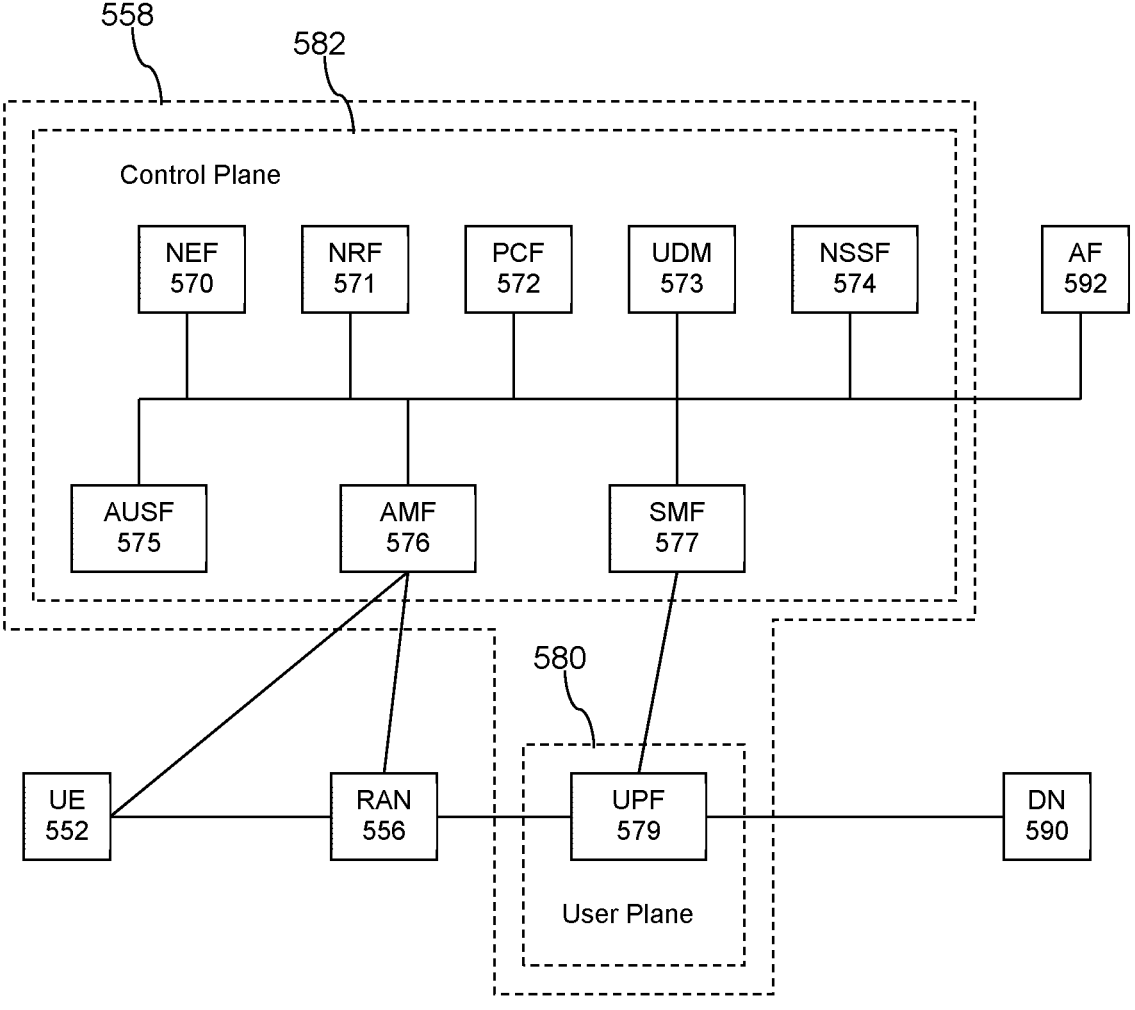

Turning now to FIG. 5B, further details of the core network 558 are described. In an embodiment, the core network 558 is a 5G core network. 5G core network technology is based on a service based architecture paradigm. Rather than constructing the 5G core network as a series of special purpose communication nodes (e.g., an HSS node, an MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) or container network functions (CNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access network 556, to a data network 590 (e.g., the network 560 illustrated in FIG. 5A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be executed on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 6:
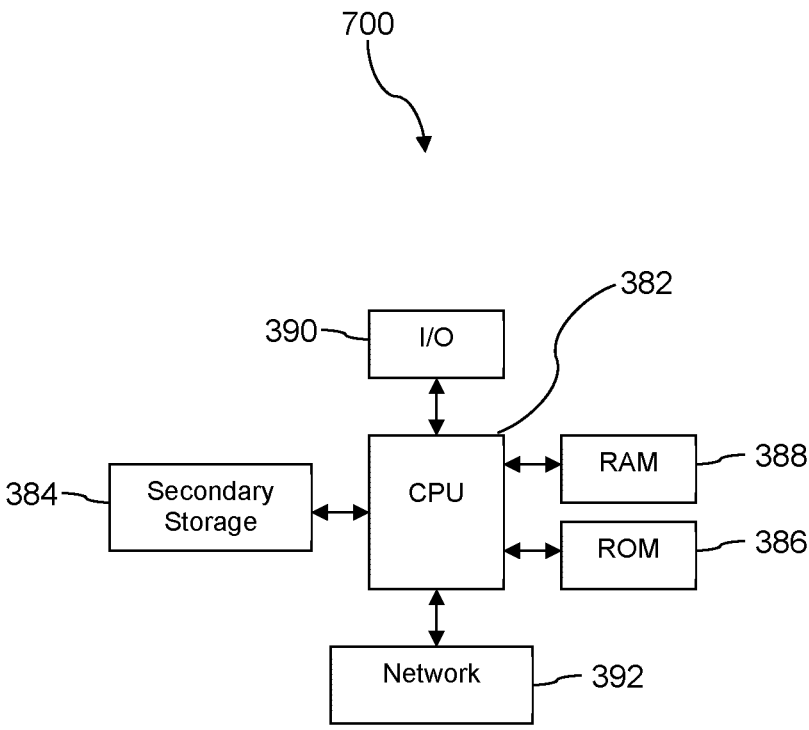
FIG. 6 is a block diagram of a computer system implemented within the communication system of FIG. 1 according to an embodiment of the disclosure.

FIG. 6 illustrates a computer system 700 suitable for implementing one or more embodiments disclosed herein. In an embodiment, the wireless communication device 106, the core network 110, and/or the core authentication application 128 may be implemented as the computer system 700. The computer system 700 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 700, at least one of the CPU 382, the RAM 388, and the ROM 386 are changed, transforming the computer system 700 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 700 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor

382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 700 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 700 to provide the functionality of a number of servers that is not directly bound to the number of computers in the computer system 700. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 700, at least portions of the contents of the computer program product to the secondary storage 384, to the ROM 386, to the RAM 388, and/or to other non-volatile memory and volatile memory of the computer system 700. The processor 382 may process the executable instructions and/or data structures in part by directly accessing the computer program product, for example by reading from a CD-ROM disk inserted into a disk drive peripheral of the computer system 700. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 700.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 700 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

US 12,604,186 B2

23

What is claimed is:

1. A method performed by a system for authenticating a wireless communication device with a carrier network to access the carrier network, wherein the method comprises:

maintaining, in a data store accessible by a core network of the carrier network, a ledger comprising a plurality of records corresponding to different wireless communication devices registered with the carrier network, wherein the plurality of records comprise a record associated with the wireless communication device, wherein the record comprises a plurality of pre-provisioned security parameters related to the wireless communication device;

maintaining, in a memory of the wireless communication device, the plurality of pre-provisioned security parameters related to the wireless communication device;

transmitting, by the wireless communication device to the core network, an authentication request for access to the carrier network, the authentication request comprising at least one security parameter stored at both the wireless communication device and in the record at the data store;

receiving, at the core network from the wireless communication device, the authentication request;

inputting, by a core authentication application of the core network to a first security application in the core network, the at least one security parameter in the authentication request received from the wireless communication device;

outputting, by the first security application in response to the input of the at least one security parameter, a registration identifier;

transmitting, to the wireless communication device by the core authentication application of the core network, an authentication information message comprising the registration identifier;

receiving, at the wireless communication device, the authentication information message;

inputting, by a device authentication application of the wireless communication device to a second security application in the wireless communication device, the registration identifier in the authentication information message received from the core authentication application;

outputting, by the second security application in response to the input of the registration identifier, a device-side authentication identifier;

transmitting, to the core network by the device authentication application, the device-side authentication identifier;

inputting, by the core authentication application to a third security application in the core network, the registration identifier;

outputting, by the third security application in response to the input of the registration identifier, a network-side authentication identifier;

determining, by the core authentication application of the core network, whether the device-side authentication identifier matches the network-side authentication identifier;

authenticating and authorizing, by the core authentication application of the core network, the wireless communication device to access the carrier network when the device-side authentication identifier is determined to match the network-side authentication identifier; and

accessing, by the wireless communication device, the carrier network in accordance with the authentication and authorization.

2. The method of claim 1, wherein the security parameters comprise at least one of identification data identifying the wireless communication device, software and hardware data describing software features and hardware features of the wireless communication device, one or more keys used for authenticating the wireless communication device, or capability data describing one or more capabilities of the wireless communication device.

3. The method of claim 1, wherein the at least one security parameter in the authentication request is a device serial identifier of the wireless communication device allocated by a manufacturer of the wireless communication device.

4. The method of claim 1, wherein the first security application receives the at least one security parameter from the authentication request and a key from the pre-provisioned security parameters stored in the record as input, and wherein an output of the first security application comprises the registration identifier.

5. The method of claim 1, wherein the second security application and the third security application comprise a common security algorithm.

6. The method of claim 1, wherein the device-side authentication identifier is obtained in response to inputting the registration identifier and one or more other security parameters into the second security application, and wherein the network-side authentication identifier is obtained in response to inputting the registration identifier and the one or more other security parameters into the third security application.

7. A system comprising:

a wireless communication device; and a core network comprising:

at least one first processor;

at least one first non-transitory memory;

a data store configured to store a ledger comprising a plurality of records corresponding to different wireless communication devices registered with a carrier network in association with a subscriber, wherein the plurality of records comprise a record associated with the wireless communication device, wherein the record comprises a plurality of pre-provisioned security parameters related to the wireless communication device; and a core authentication application, stored in the at least one first non-transitory memory, which when executed by the at least one first processor, causes the at least one first processor to be configured to:

receive, from the wireless communication device, an authentication request comprising at least one security parameter previously stored in a record at the data store;

obtain a registration identifier in response to inputting the at least one security parameter received in the authentication request into a first security application;

obtain a network-side authentication identifier in response to inputting the registration identifier into a second security application;

transmit, to the wireless communication device, an authentication information message comprising the registration identifier;

receive, from the wireless communication device, a device-side authentication identifier derived from the registration identifier according to a third security application;

determine whether the device-side authentication identifier matches the network-side authentication identifier;

authenticate and authorize the wireless communication device to access the carrier network when the device-side authentication identifier is determined to match the network-side authentication identifier; and enable the wireless communication device to access the carrier network in accordance with the authentication and authorization, wherein the wireless communication device comprises:

at least one second processor;

at least one second non-transitory memory;

a database configured to maintain the plurality of pre-provisioned security parameters related to the wireless communication device; and the device authentication application, stored in the at least one second non-transitory memory, which, when executed by the at least one second processor, causes the at least one second processor to be configured to:

transmit, by the wireless communication device to the core network, the authentication request for access, the authentication request comprising the at least one security parameter;

receive, at the wireless communication device, the authentication information message;

input, to the third security application in the wireless communication device, the registration identifier in the authentication information message received from the core authentication application;

receive, from the third security application in response to the input of the registration identifier, the device-side authentication identifier;

transmit, to the core network by the device authentication application, the device-side authentication identifier; and access, by the wireless communication device, the carrier network in accordance with the authentication and authorization.

8. The system of claim 7, wherein the ledger is a block-chain, and wherein a first block of the block chain comprises a device serial identifier identifying the wireless communication device.

9. The system of claim 7, wherein the security parameters comprise at least one of identification data identifying the wireless communication device, software and hardware data describing software features and hardware features of the wireless communication device, one or more keys used for authenticating the wireless communication device, or capability data describing one or more capabilities of the wireless communication device.

10. The system of claim 7, wherein the at least one security parameter in the authentication request is a device serial identifier of the wireless communication device allocated by a manufacturer of the wireless communication device.

11. The system of claim 7, wherein the first security application receives the at least one security parameter from the authentication request and a key from the pre-provisioned security parameters stored in the record as input, and wherein an output of the first security application comprises the registration identifier.

12. The system of claim 7, wherein the network-side authentication identifier is obtained in response to inputting the registration identifier and one or more other security parameters into the second security application.

13. The system of claim 7, wherein the first security application and the second security application are different security algorithms.

* * * * *